US005752473A

United States Patent [19]

De Roovere

[11] Patent Number: 5,752,473

[45] Date of Patent: May 19, 1998

[54] MOVABLE BARROW DEVICE FOR FACILITATING THE DROPPING OF YOUNG

[75] Inventor: Peter De Roovere, Heist-Op-Den-Berg, Belgium

[73] Assignee: ALURO, besloten vennootschap met beperkte aansprakelijkheid, Belgium

[21] Appl. No.: 700,366

[22] PCT Filed: Mar. 1, 1995

[86] PCT No.: PCT/BE95/00020

§ 371 Date: Sep. 4, 1996

§ 102(e) Date: Sep. 4, 1996

[87] PCT Pub. No.: WO95/23562

PCT Pub. Date: Sep. 8, 1995

[30] Foreign Application Priority Data

Mar. 4, 1994 [BE] Belgium ............................... 09400240

[51] Int. Cl.[6] ............................... A61D 1/08; B62B 1/18

[52] U.S. Cl. ................... 119/728; 280/47.31; 280/47.32; 606/124

[58] Field of Search .................................... 119/728, 727, 119/722, 757; 280/47.31, 47.32; 254/323, 328; 606/124

[56] References Cited

U.S. PATENT DOCUMENTS

| | | | |
|---|---|---|---|
| 1,885,945 | 11/1932 | Ransy | 606/124 |
| 2,522,508 | 9/1950 | Frank | 606/124 |
| 5,224,444 | 7/1993 | Hill et al. | 119/727 |
| 6,090,368 | 2/1992 | Berghoefer | 119/728 X |

FOREIGN PATENT DOCUMENTS

| | | | |
|---|---|---|---|
| 156394 A | 1/1954 | Australia | 119/722 |
| 224225 A | 2/1958 | Australia | 119/722 |
| 385974 A | 2/1932 | Belgium . | |
| 2505648 | 11/1982 | France | 606/124 |

*Primary Examiner*—Michael J. Carone
*Assistant Examiner*—Yvonne R. Abbott
*Attorney, Agent, or Firm*—Bacon & Thomas

[57] ABSTRACT

Movable device for facilitating the dropping of young has a rope-like element which can be fastened to the young and upon which a tractive force may be exerted, and a collection element for collecting the young. The collection element is carried by a frame that extends along a longitudinal axis and includes a distal end and a proximal end. A wheel that serves as a windlass traction device for tensioning the rope and as a wheel for the barrow is rotatably attached to the frame distal end and aligned with the longitudinal axis. A lifting element is attached to the frame proximal end such that the collection element, the frame, the lifting element and the wheel form a wheelbarrow arrangement that is readily tiltable. Tilting guides facilitate tilting of the barrow.

11 Claims, 3 Drawing Sheets

MOVABLE BARROW DEVICE FOR FACILITATING THE DROPPING OF YOUNG

BACKGROUND OF THE DISCLOSURE

1. Field of the Invention

The present invention concerns a device to facilitate the dropping of young.

In the first place, this device is designed to be used for the dropping of calves, but in general it can also be used for several other animals.

2. Description of the Related Art

Numerous problems are known to arise during the dropping of young, in particular with cows, horses and such like.

A first disadvantage arises when a cow lies down on the ground in a stable during the calving. Under these circumstances, the newborn calf will make contact with the floor or ground. This floor or ground is usually not hygienic, which creates a risk of infection of the calf.

Another disadvantage related to the calving of a cow is that the presence of one person is usually not enough to assist during the calving, so that several persons must always be available.

Another problem which arises during the calving is that it is usually very difficult to extricate the calf from the mother. Therefore, the legs of the calf must be tied with a rope with which the calf can be slowly pulled out, which in many cases is a time-consuming and tiring job.

Also, the object of the present invention is a device to be used for the dropping of young which offers a solution to the above-mentioned disadvantages.

SUMMARY OF THE INVENTION

To this aim, the invention relates to a device to be used for the dropping of young, which is movable and comprise the combination of a rope or such which can be fastened to the young; means to exert a tractive force on the rope; and an element to collect the young which is in the shape of a barrow having a frame with a wheel on one end and lifting means on the other end.

As a result, the farmer can lend help during the dropping of young in a simple, relatively hygienic manner without additional help being required.

BRIEF DESCRIPTION OF THE DRAWINGS

In order to better explain the characteristics of the invention, the following preferred embodiment is described as an example only without being limitative in any way, with reference to the accompanying drawings, in which.

DETAILED DESCRIPTION OF THE PREFERRED EMBODIMENT

Figure 1:
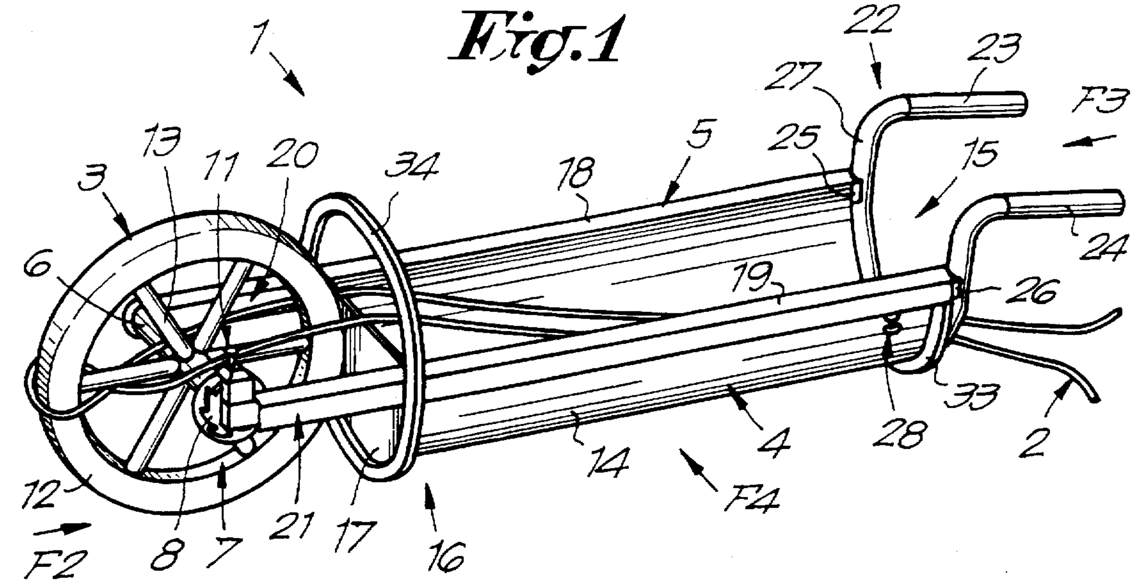
FIG. 1 shows a device according to the invention in perspective.
Figure 2:
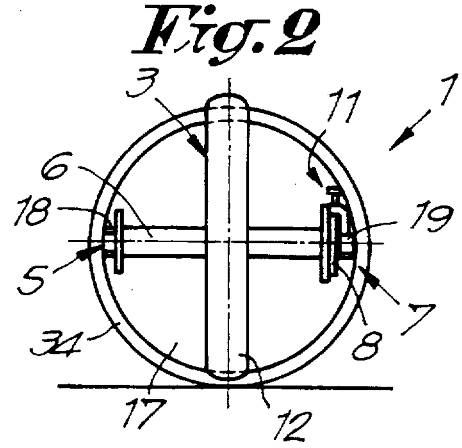
FIGS. 2, 3 and 4 show views according to arrows F2, F3 and F4 in FIG. 1.
Figure 3:
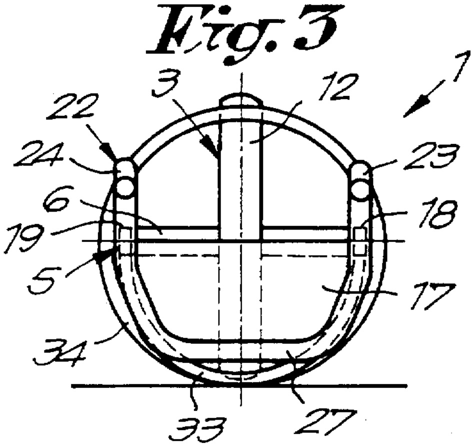

As shown in the FIGS. 1 to 4, the device 1 according to the invention consists of the combination of a rope 2 or rope-like element which can be fixed to the young; a traction device 3 to exert a tractive force on the rope 2; and a collection element 4 to collect the young.

Hereby, the device 1 can be moved. To this end, the different constituent parts are provided on a mobile frame 5 having a proximal end 15 and a distal end 16, so that the whole has the shape of a barrow having a longitudinal axis extending centrally from the proximal to the distal end.

The above-mentioned traction device 3 preferably consist of a windlass 6 on which the above-mentioned rope 2 can be wound.

Preferably, it is a hand-driven windlass 6.

As represented in FIGS. 1, 2, 4, 5 and 6, the windlass 6 can be provided with a blocking system 7 which only allows for a rotation in one direction, such that during the winding of the rope 2, the unwinding thereof is prevented. The blocking system 7 may consist, as is represented, of a ratchet interlocking, consisting of a ratchet wheel 8 which is firmly fixed on the windlass 6 and a ratchet 9 mounted on the frame 5 which is pressed against the ratchet wheel 8 by means of a spring 10.

Preferably, the blocking system 7 will be provided with means which allow for the release thereof, such as an element 11 to lift the ratchet 9.

In order to rotate the windlass 6, it is provided with a wheel 12, preferably with a plurality of spokes 13, which make it possible to easily exert a manual force thereupon.

The above-mentioned collection element 4 to collect the young preferably comprises a tub-shaped element, more in particular a tray which has a longitudinal axis generally aligned with the barrow longitudinal axis and which is open on one proximal end. In the example shown, this element consists of a semi-cylindrically bent bottom 14 and it is open on one axial proximal end 15, whereas it is closed on the other distal axial end 16 by means of a standing wall 17.

The collection element 4, and in particular the bottom 14, may consist of a bent plate, for instance made of aluminium or an aluminium alloy, such as Al-Mg-Si, because of the great resistant strength, the light mass and the corrosion resistance thereof.

The collection element 4 can also be provided with a protective coat, so that it can be easily cleaned, such as a coat of enamel, a coat of paint or such.

Figure 4:
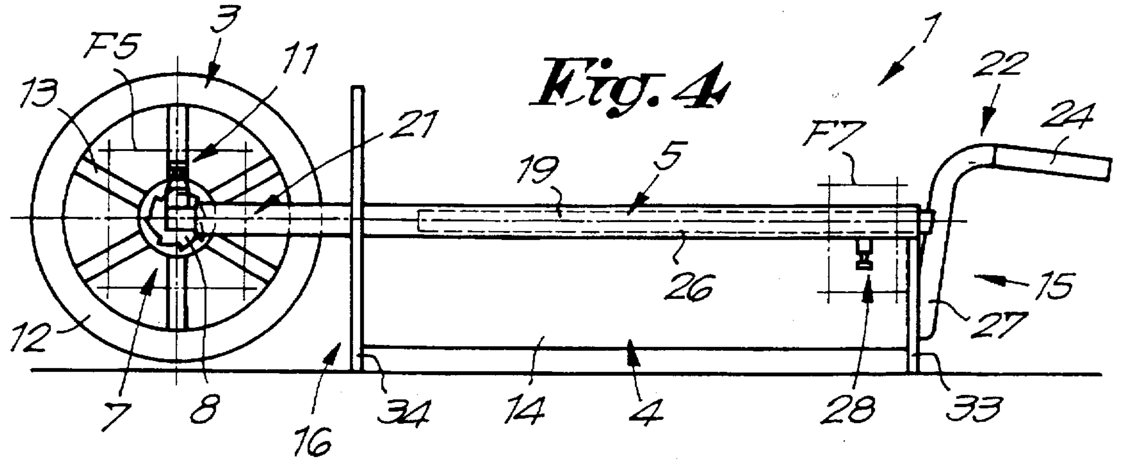
Figure 5:
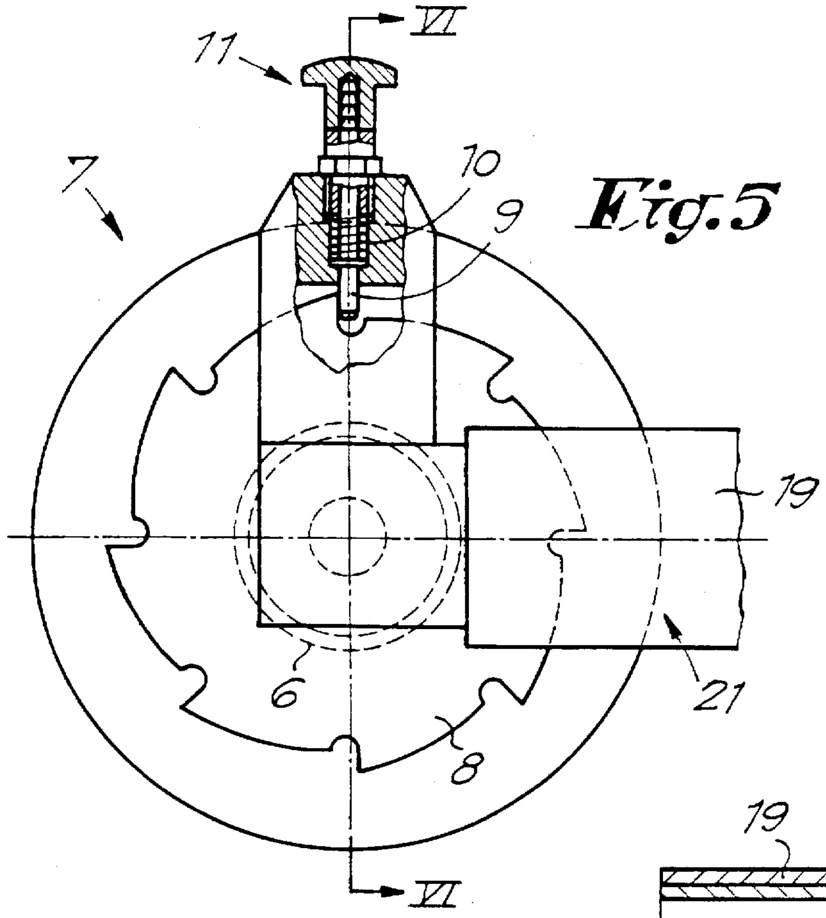
FIG. 5 shows a view to a larger scale of the part which is indicated in FIG. 4 with F5.

The traction device 3 and the element 4 are preferably erected in relation to one another as is represented in the FIGS. 1 and 4, in other words the windlass 6 is mounted in front of the end 16 of the element 4.

To this end, the frame 5 can be mainly composed of two parallel supports, first support 18 and a second support 19 having proximal support ends and distal support ends under and/or in between which the collection element 4 is fixed, whereby these supports reach past the collection element 4 with their distal support ends 20 and 21, and whereby the windlass 6 is mounted between these distal support ends 20 and 21.

As mentioned above, the whole is mobile and made in the shape of a barrow.

The wheel of the barrow preferably consists of the already mentioned wheel 12 to rotate the windlass 6 and which is centrally located in alignment with the longitudinal axis of the collection element 4 and the barrow.

In order to be able to lift and to roll the whole, such as with a barrow, lifting means 22 are provided near the proximal end 15. In the example shown, these mainly consist of handgrips 23 and 24. These handgrips 23 and 24 are connected to lifting arms 25 and 26 which are preferably fixed on or in the supports 18–19 in an extending manner. The handgrips 23 and 24 hereby consist of bent parts of a common U-shaped element 27, which is fixed against the crosscut ends of the above-mentioned lifting arms 25 and 26. This U-shaped element 27 provides for a stable link between the supports 18 and 19. Its U-shape mainly corresponds to the bent shape of the collection element 4, such that the entry to the open proximal end 15 is not obstructed, as it is situated under or next to the opening of the cow during the calving.

It should be noted that the handgrips are preferably situated higher than the collection element 4 and extend in a proximal direction as represented in the FIGS. 1 to 4. During the calving, they rest on the back part of the cow, as will be further described by means of FIGS. 8 and 9.

Figure 7:
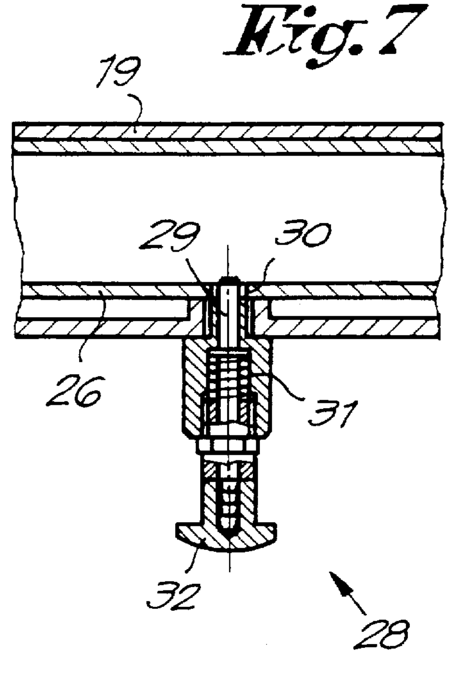
FIG. 7 shows a view, as a section and to a larger scale, of the part which is indicated in FIG. 4 with F7.
Figure 6:
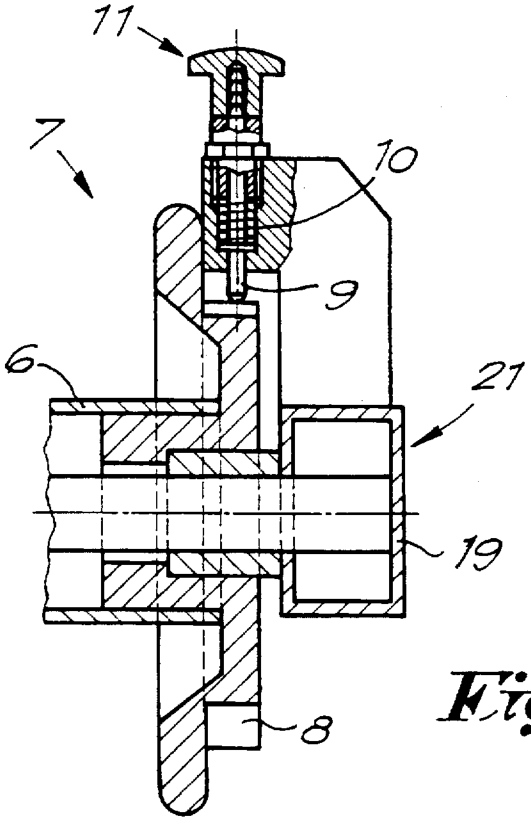
FIG. 6 shows a section according to line VI—VI in FIG. 5.

The actual length of the lifting arms 25 and 26, in other words the distance between the collection element 4 and the handgrips 23 and 24, can be set by means of an adjusting mechanism 28 which is represented in FIGS. 4 and 7 and which mainly consists of a pin 29 mounted on the frame 5 which can mesh in a plurality of openings 30 in the lifting arm 25 or 26 in question, with the help of the pressure of a spring 31. The pin 29 can be withdrawn from the locked situation by means of a button 32.

As is clear in FIGS. 1 to 4, the device 1 is preferably also provided with means which make it possible to turn it sideways. In the example shown, these means consist of, on the one hand, a semicircular guide 33 on the open proximal end 15 of the collection element 4, and on the other hand, a circular guide 34, which is situated near the distal end 16.

It is clear that the above-mentioned traction device 3 to exert a tractive force on the rope 2 may also be of a different nature than a windlass 6. Moreover, these traction device 3 can be provided elsewhere, for example above the distal end 16 of the element 4.

Figure 8:
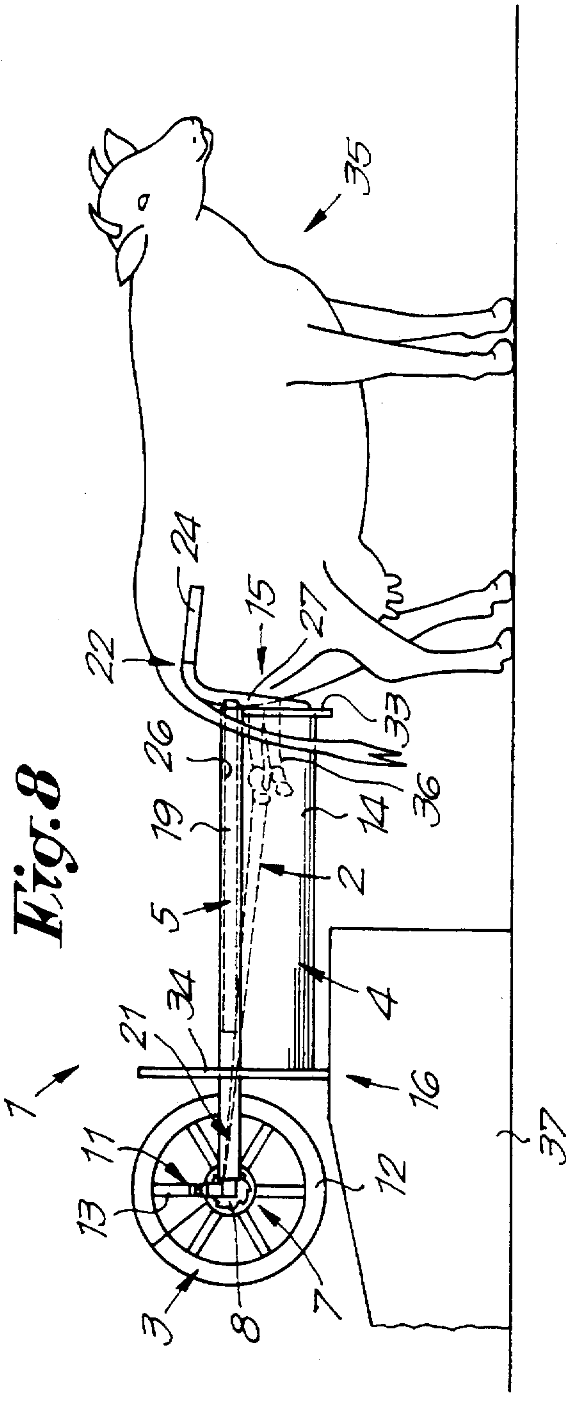
FIGS. 8 and 9 show the operation and use of the device from FIGS. 1 to 7.

The use and operation of the device according to the invention is schematically represented in FIG. 8 and is as follows.

When a cow 35 is about to drop its young, it is known that the legs 36 appear first. As of that moment, the rope 2 is tied to the legs 36.

Hereafter, the device 1 is placed on the back of the cow 35 with the handgrips 23–24 and possibly fixed to it.

In case the cow 35 calves standing, the device will hang on the back of the cow with the handgrips 23 and 24, as represented in FIG. 8. The device 1 can hereby be put horizontally, by placing an elevation 37 or such under the distal end 16.

After this, the rope 2 is put around the windlass 6 and/or attached to the circumference of the wheel 12 and the winding thereof around the windlass 6 can begin.

It is to be noted that in the most preferred embodiment, whereby the device 1 is made of light materials, such as an aluminium alloy, and has a total weight of approximately 15 kg or less, the support by the elevation 37 is not necessary. Indeed, the free end of the device 1, which does not rest on the back of the cow 35, only weighs some five kilograms and can, during the pulling, easily be held up by the person operating the wheel 12. Once the rope 2 is tightened, the device automatically remains in place, and follows the movements of the cow 35. This means that the device 1 assumes the same position as in FIG. 8, but that it hangs freely in the air without the elevation 37 being present. In fact, this suspended attachment is safer, since a support, such as an elevation 37, forms a danger for the cow 35.

In any case, one should make sure that the wheel 12 does not rest on the bottom or on the elevation 37.

By turning the wheel 12 manually, the rope 2 is wound on the windlass 6 and the calf is pulled out. The blocking system 7 hereby prevents the calf from sliding back during any possible interruptions of the pulling and in case the wheel 12 is released.

As the windlass 6 is further rotated, the young is gradually pulled on the collection element 4.

Afterwards, the rope 2 is untied from the legs 36 and by lifting the ratchet 9, the rope 2 can be unwound from the windlass 6.

The collection element 4, or in other words the collecting tub, in which the calf or such like ends up, isolates the animal from the mostly not hygienic surroundings where the birth takes place. By using the device 1 as a barrow, it is extremely easy to remove the newly born animal, clean it, possibly with a water hose, and transport it to its eventual place or, if necessary, put it back in the collection element 4 after the cleaning.

Figure 9:
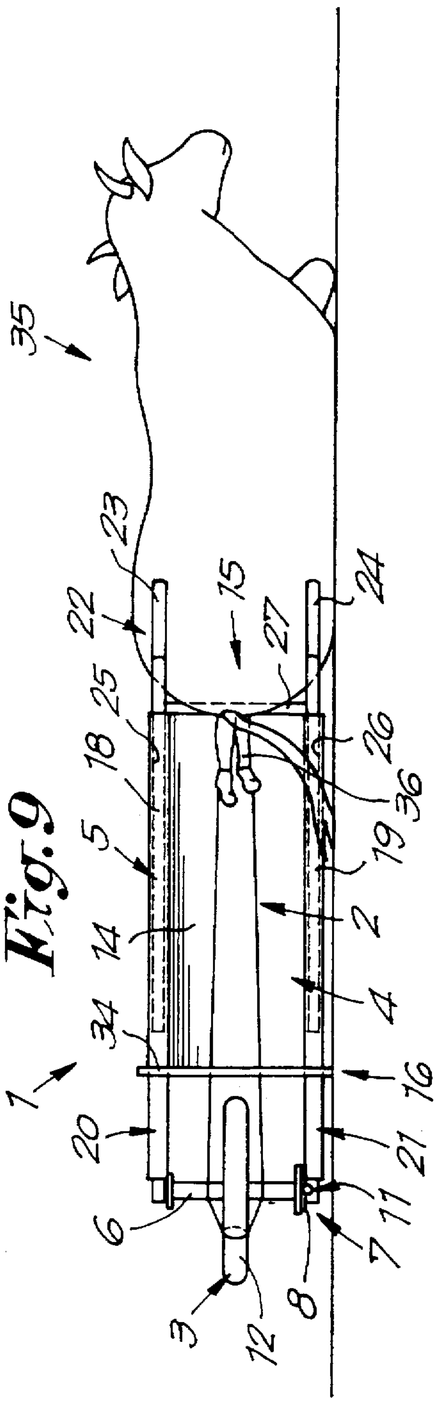

In case the cow 35 lies on its side as represented in FIG. 9, the device is placed against the cow 35 in a tilted position and possibly attached to it.

The pulling out of the calf is done in an analogous way as described by means of FIG. 8. After the calf has been pulled out, the device 1 is raised again. The raising is made easier thanks to the guides 33–34 which allow for a simple rotation.

The extending lifting arms 25 and 26 make it possible to adjust the position of the handgrips 23 and 24 optimally in relation to the animal during the positioning of the device 1 against said animal and they also allow for the lifting arms 25 and 26 to be extended during the transport, so that less weight needs to be lifted at the handgrips 23 and 24.

It is clear that instead of the handgrips 23 and 24, also other support means can be used to fix the device 1 to the mother animal, whereby these support means preferably are conceived in such a way that the device 1 can be suspended to the mother animal 35, so that this device 1 follows the movements of the mother animal 1.

Moreover, the limited total weight of the device, together with the form of the construction and the easy manoeuvrability allow that this device 1 can be mounted vertically, which is very useful if the newly born animal has breathing problems, by inhaling amniotic fluid or slime. Indeed, it is possible then to fasten the newly born animal with its back legs to the rope 2, to wind up this rope, and to place the device upright with the wheel 12 upwards, in such a way that the animal is suspended with its head downwards, so that excess slime and the amniotic fluid are released automatically due to the force of gravity.

The present invention is by no means limited to the above-described embodiment represented in the figures; on the contrary, such a device can be made in all sorts of shapes and dimensions while still remaining within the scope of the invention.

I claim:

1. A movable device for facilitating the dropping of young comprising:

- a rope-like element which can be fastened at one end to the young;
- a traction device for exerting a tractive force on said rope-like element;
- a collection element and a frame with a distal end and a proximal end, said collection element mounted on said frame between said distal and proximal ends;

said collection element and frame being in the shape of a barrow having a longitudinal central axis;

a single wheel device rotatably attached to the frame distal end and aligned with said longitudinal axis; and lifting means attached to said proximal end such that said collection element, said frame, said lifting means and said single wheel device form a wheelbarrow arrangement that may be readily tilted to either side of the longitudinal axis.

2. A movable device according to claim 1, wherein said traction device comprises a windlass which is connected to and turned by said wheel.

3. A movable device according to claim 2, further comprising:

a plurality of spokes each having a first end and a second end, and which at said first end are fixed to and extend radially from said windlass and at said second end are fixed to an inner circumference of said wheel; and a blocking system disposed on said windlass which prevents rotation of said windlass in one direction.

4. A movable device according to claim 2, wherein said frame includes a first support and a second support, each support having a proximal support end and a distal support end, said first and second supports being longitudinally disposed on opposite sides of said collection element and parallel to each other; and wherein said windlass is rotatably mounted between said first and second supports at said distal support ends and said lifting means is located at said proximal support ends.

5. A movable device according to claim 4, including a U-shaped element with parallel bent portions at its free ends which form handgrips, said U-shaped element connected to and spanning said lifting arms.

6. A movable device according to claim 5, wherein said lifting arms are extendable along the longitudinal axis.

7. A movable device according to claim 1, wherein said lifting means includes extendable lifting arms extending along the longitudinal axis.

8. A movable device according to claim 1, further including guide means for guiding the wheelbarrow relative to a support during a tilting movement of the wheelbarrow about the longitudinal axis.

9. A movable device according to claim 8, wherein said guide means comprises a semi-circular guide disposed at the proximal end area of the frame and a circular guide located at the distal end area of the frame.

10. A movable device according to claim 1, wherein said collection element comprises a tray formed of a semi-cylindrical bent plate-like element which is open at one end adjacent the frame proximal end and is closed at its opposed end by a transverse wall.

11. A movable device according to claim 1, including support means for fixing said device to a mother animal such that said device may be suspended on the mother animal to thereby follow the movements of the mother animal.

* * * * *